C. JONES.
Heating Stove.
No. 2,714.
Reissued Aug. 6, 1867.
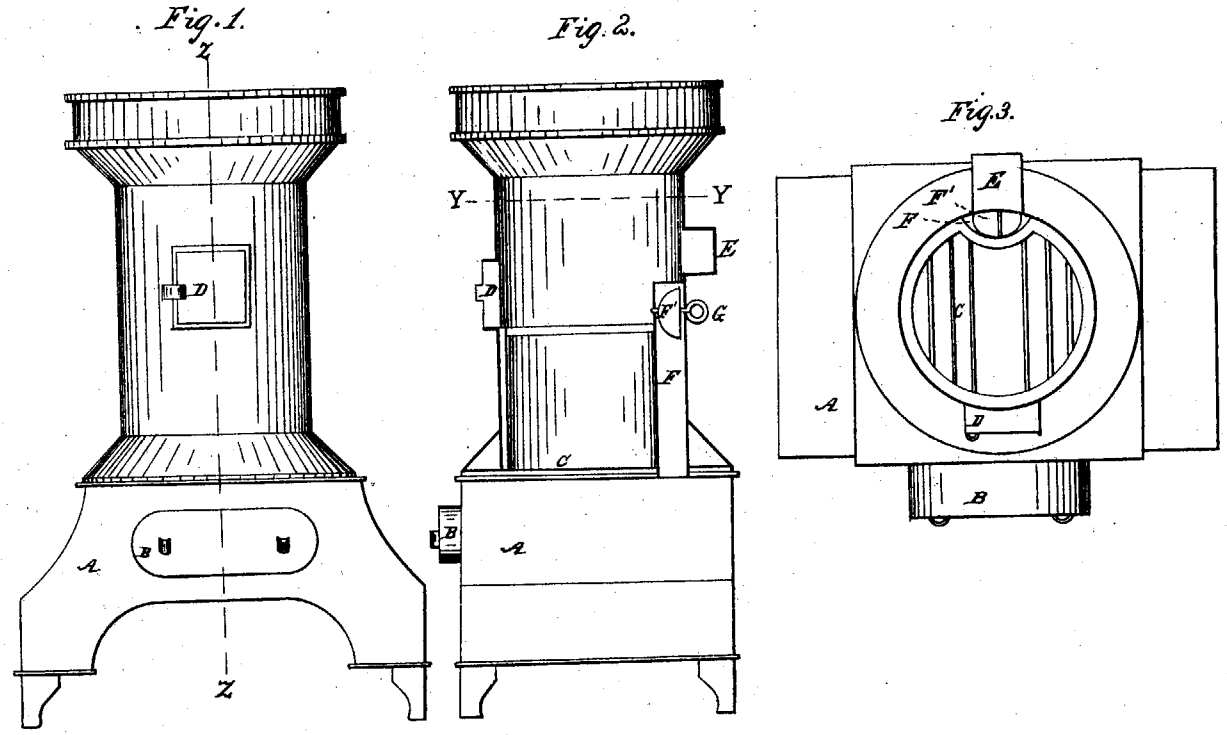
Witnesses:
Thomas C. Smith
Geo R Adams
Inventor:
Charles Jones
By his Atty J Dennis F.
N. PETERS, Photo-Lithographer, Washington, D. C.

United States Patent Office.

CHARLES JONES, OF PHILADELPHIA, PENNSYLVANIA.

*Letters Patent No.* 29,175, *dated July* 17, 1860; *reissue No.* 2,714, *dated August* 6, 1867.

IMPROVEMENT IN HEATING-STOVES.

The Schedule referred to in these Letters Patent and making part of the same.

TO ALL WHOM IT MAY CONCERN:

Be it known that I, CHARLES JONES, of the city and county of Philadelphia, and State of Pennsylvania, have invented certain new and useful Improvements in Stoves for Heating and Cooking, also applicable to heaters and ranges; and I do hereby declare the following description and accompanying drawings are sufficient to enable any person skilled in the art or science to which it most nearly appertains to make and use my said invention or improvements without further invention or experiment.

The nature of my invention and improvement consists in a dust or check-draught flue inside of the stove, heater, or range, which may be placed either in the rear, front, or on the side of the fire-pot or box, leading from the space below the grate to the space above the fire, or into the escape-flue or pipe which conducts away the smoke or products of combustion, for the purpose of carrying off the dust and ashes when the fire is raked and prevent them from escaping into the room or apartment. Also in arranging a damper or other device to close the above-mentioned flue, to make the air or draught draw through the fire. In the accompanying drawings—

Figure 1 is the elevation of the front of a stove with my improvements.

Figure 2 is a section through the line Z Z of fig. 1.

Figure 3 is a horizontal section below the line Y Y of fig. 2.

In the accompanying drawings, A is the base of the stove, which may be made in the form shown, or in such other form as will answer the purpose intended. It is provided with an opening at B, for the air to enter under the grate C to supply the fire, through which opening a poker may be inserted to rake and stir the fire or coals on the grate C. That portion of the stove above the grate may be made circular or otherwise, and provided with a door, D, to supply fuel, and an exit pipe, E, to conduct off the smoke and other products of combustion. Inside of the stove, either in front or rear, or at the side of the fire-pot or box, I make a dust or check-draught flue, F, from below the grate C up into the space above the fire. This flue F may be arranged in such a position in the stove as may be most convenient or desirable; and it may be made to lead from below the grate to the escape-flue inside of the stove without entering the space above the fire, if preferred that way. I provide the flue F with a valve or damper, F′, which may be opened or closed by the handle G outside the stove. The object and purpose of this flue is to have the draught through it take the dust and fine ashes from below the grate when the fire is raked, and carry them up above the fire or into the exit-flue or pipe, and prevent their escaping through the opening B into the room or apartment. This flue F may be used to graduate or check the draught through the fire by adjusting the damper F′, and at the same time keep up and continue the draught through the stove to ventilate the room and carry off the noxious gases arising from the fire, which have sometimes proved fatal to persons occupying the room containing the stove when the draught opening and damper have both been closed.

I believe I have described and represented my improvements so clearly that skillful artisans will be enabled to apply and adapt them to any kind of stoves or ranges in which they may desire to use them with success.

What I claim as my invention and improvements, is—

A dust or check-draught flue inside of a heating or cooking-stove, also applicable to heaters and ranges, leading from the space or ash-pit below the grate to the space above the fire, or into the escape-flue or pipe which conducts away the smoke or products of combustion, for the purpose of carrying off the dust and ashes when the fire is raked, which flue may be placed either in the rear, in front, or at the side of the fire-pot or box.

And in combination with the dust-flue arranged as above claimed, I claim a damper or other device for closing the flue F, and making the air or draught draw through the fire, substantially as described.

CHARLES JONES.

Witnesses:

BERTRAM A. BUZBY,

GEO. A. WETTER.